No. 691,303.  
Patented Jan. 14, 1902.

H. A. BALLARD & W. A. COPELAND.
LEATHER TREATING MACHINE.
(Application filed Sept. 16, 1901.)

(No Model.)  
7 Sheets—Sheet I.

Fig. 1.

WITNESSES:  
INVENTORS.

No. 691,303. Patented Jan. 14, 1902.
H. A. BALLARD & W. A. COPELAND.
LEATHER TREATING MACHINE.
(Application filed Sept. 16, 1901.)

(No Model.) 7 Sheets—Sheet 5.

Fig. 6.

WITNESSES: INVENTORS

No. 691,303.  
Patented Jan. 14, 1902.

H. A. BALLARD & W. A. COPELAND.
LEATHER TREATING MACHINE.
(Application filed Sept. 16, 1901.)

(No Model.)  
7 Sheets—Sheet 7.

UNITED STATES PATENT OFFICE.

HARRIE A. BALLARD, OF ASHLAND, AND WILLIAM A. COPELAND, OF MELROSE, MASSACHUSETTS, ASSIGNORS TO THE TURNER TANNING MACHINERY COMPANY, OF BOSTON, MASSACHUSETTS, A CORPORATION OF WEST VIRGINIA.

LEATHER-TREATING MACHINE.

SPECIFICATION forming part of Letters Patent No. 691,303, dated January 14, 1902.

Application filed September 16, 1901. Serial No. 75,553. (No model.)

*To all whom it may concern:*

Be it known that we, HARRIE A. BALLARD, of Ashland, and WILLIAM A. COPELAND, of Melrose, in the county of Middlesex and State of Massachusetts, have invented certain new and useful Improvements in Leather-Treating Machines, of which the following is a specification.

This invention has relation to machines for treating hides, skins, and leather, and more particularly to that class of machines wherein the hide or skin is folded about a relatively flat table or support and is acted upon by one or more working surfaces or members each consisting of a plurality of working edges arranged in a substantially flat plane. In such machines as exemplified in Letters Patent to Turner, No. 584,123, dated June 18, 1897, and No. 615,656, dated December 6, 1898, the tables or supports are supported upon an endless carrier and are brought successively into operative position between the two working members, so that the edges of the latter members scrape or rub the skin upon the two faces of each support or table as the latter passes between them. In such machines much difficulty has been experienced in uniformly treating the entire skin or hide, for when the latter is folded about the support, so as to lie against the faces thereof, a portion of said skin or hide must necessarily lie around the end of the support, which end is usually curved and is practically inaccessible to the working members.
Various attempts have been made to insure the treatment of that portion of the skin which lies upon the end of the support; but so far as we are aware these attempts have not been productive of the best results.
According to our invention we provide one or more working members, positioned to engage the end of the support, with means whereby said members are moved longitudinally of the said edge or transversely of the path of movement of the table or support, so as to subject the skin to the same rubbing or treatment as is afforded by the main working members, to which reference has been made. A single member may be employed for treating the skin on the end of the support; but in order to overcome the lateral thrust upon the skin we employ two members which are movable in opposite directions, whereby one offsets or equalizes the strain of the other.
These members are so arranged that as the table emerges from the main working members it engages them and moves them along with it for a short distance. During this movement of the members by a suitable mechanism they are carried swiftly toward the ends of the support, so as to wipe or rub the skin from its middle toward its side edges. When the members reach their outermost positions, they are moved bodily out of the path of the table or support and permit the latter to pass, after which the members are brought to original position to operate upon the skin of the next succeeding support.

It is evident that we may embody our invention in a variety of ways, and therefore the machine which we have illustrated and shall now proceed to describe will be understood as being merely one embodiment of the invention, and that the invention is not limited to the details of construction thereof.

Referring to the accompanying drawings,
Fig. 3 is a similar section and illustrates how the table or support moves the working members longitudinally with it.

On the said drawings we have shown suitable side standards 20, between which travels an endless carrier 21, supported on sprocketwheels 22. The endless carrier is actuated by any suitable power-transmitting mechanism. Operatively connected to the carrier are a plurality of flat tables or supports 23, each of which is provided with two flat faces and two curved ends, whereby a skin or hide may be folded over one of the ends of the table, so as to lie against the two flat faces thereof. These tables or supports are carried in the direction of the arrow in Fig. 1 between two main working members, (indicated as a whole at 24 25, respectively.) These main working members are made up of a plurality of slickers adapted to engage and treat the skin on the two faces of each support as it passes between them. We have not illustrated the main working members in detail, having shown them more or less conventionally, since their construction is not material to the present invention.

In front and in rear of the main working members are placed spirally-bladed rolls 26 26 27 27. The function of the first rolls 26 26 is to preliminarily spread and remove from the hide or skin the wrinkles prior to its being acted upon by the working members 24 25, and the function of the rolls 27 27 is to impart a final polish or rubbing to the skin after it has left the said members. These rolls, to which reference has been made, are driven in any suitable way.

As thus far described the machine possesses no features of our invention, and we shall now proceed to describe those parts or features which we have added.

Figure 1:
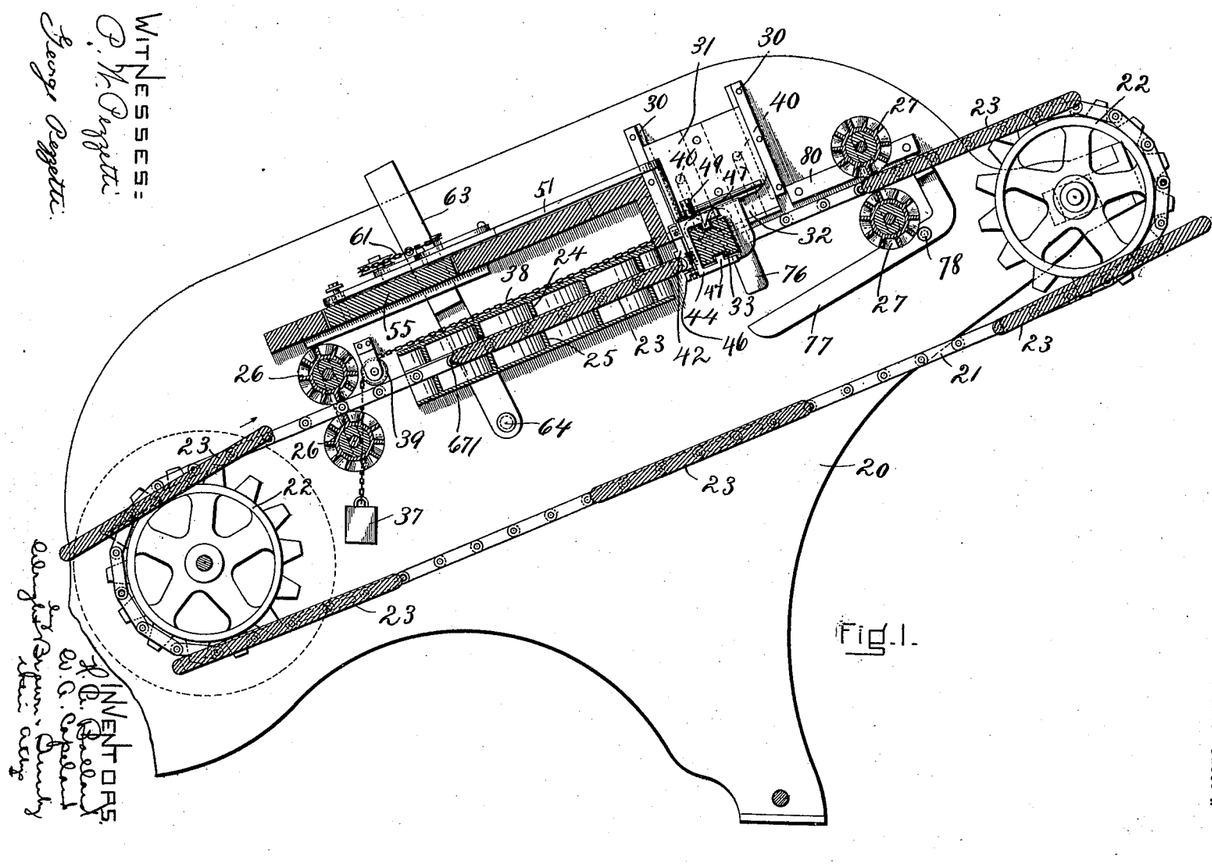
Figure 1 represents a longitudinal section of the machine embodying our improvements.
Figure 2:
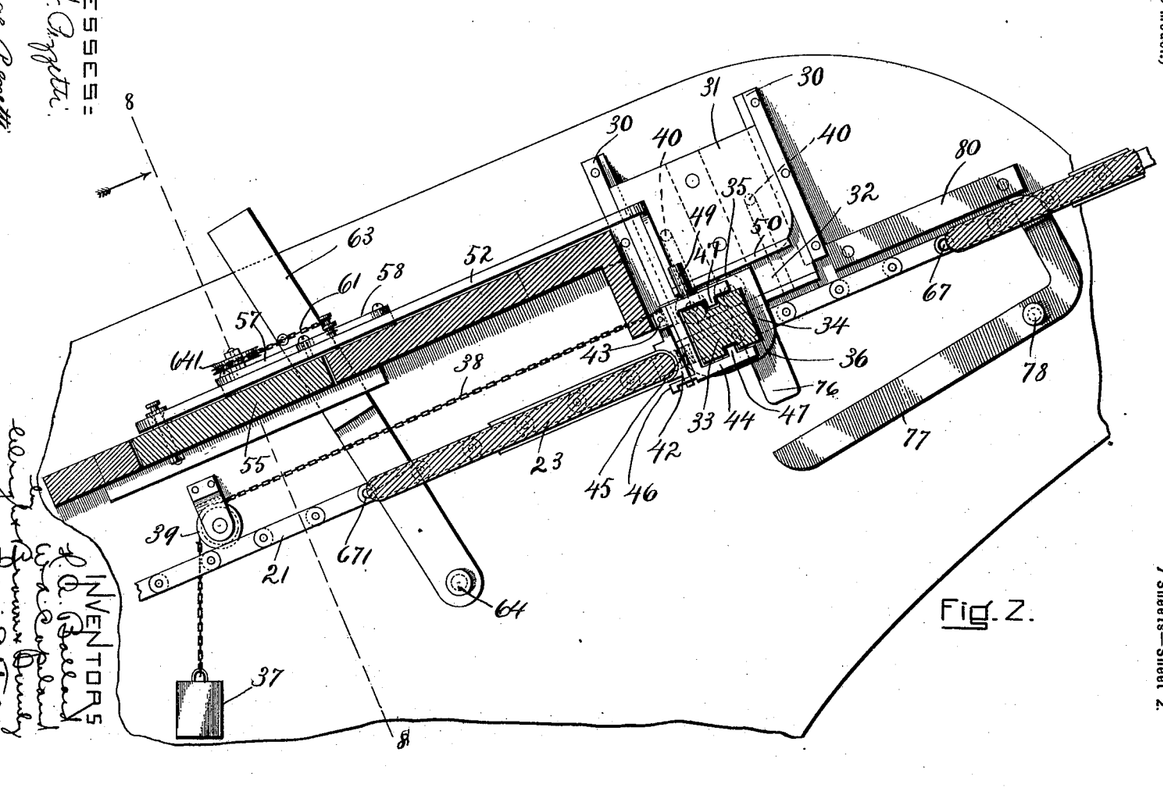
Fig. 2 is an enlarged section of the members which operate upon the skin on the end of the support, showing the members in position to operate upon the work.
Figure 4:
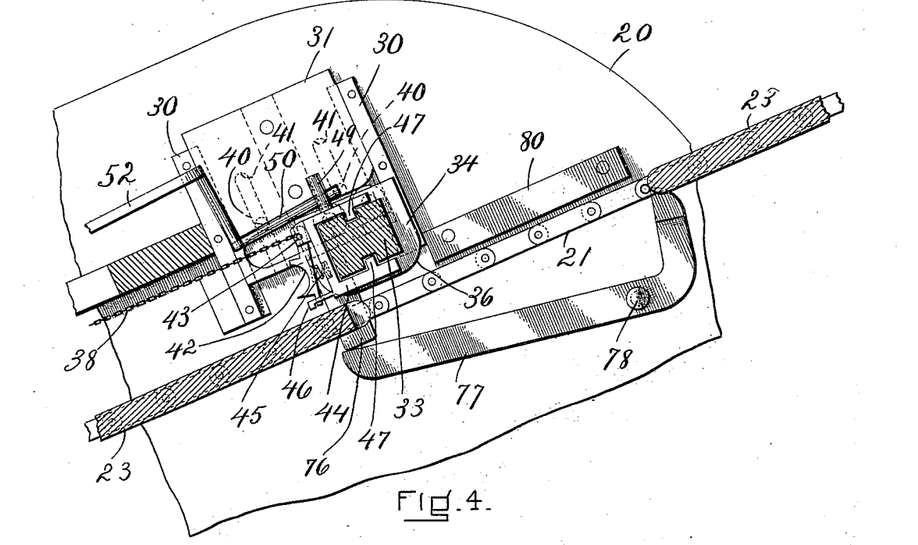
Fig. 4 illustrates the members in raised position to permit the table to pass under it.
Figure 5:
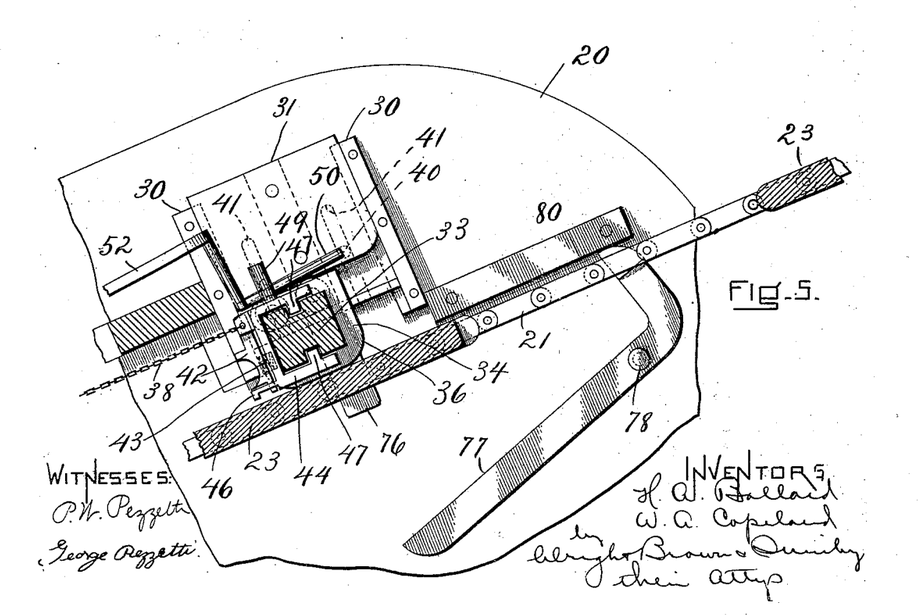
Fig. 5 shows the table passing under the members.
Figure 6:
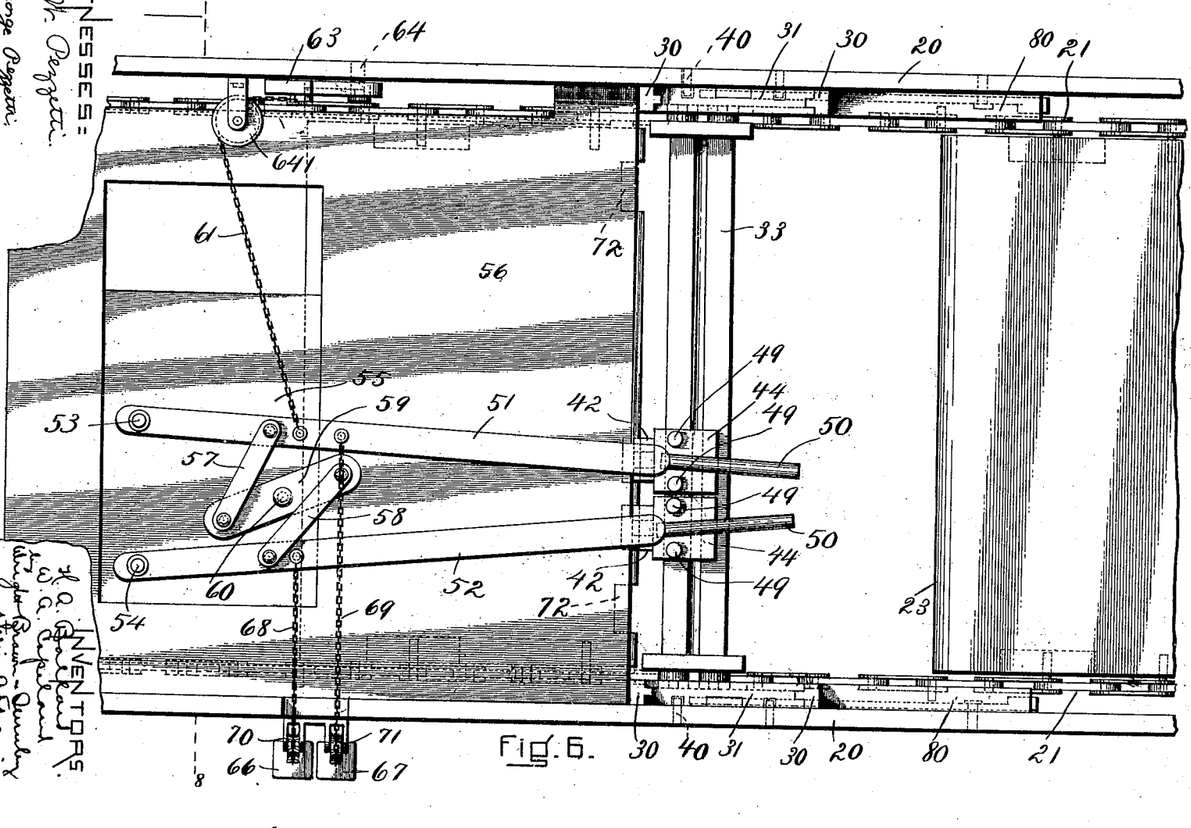
Fig. 6 is a plan view of a portion of the machine.
Figure 8:
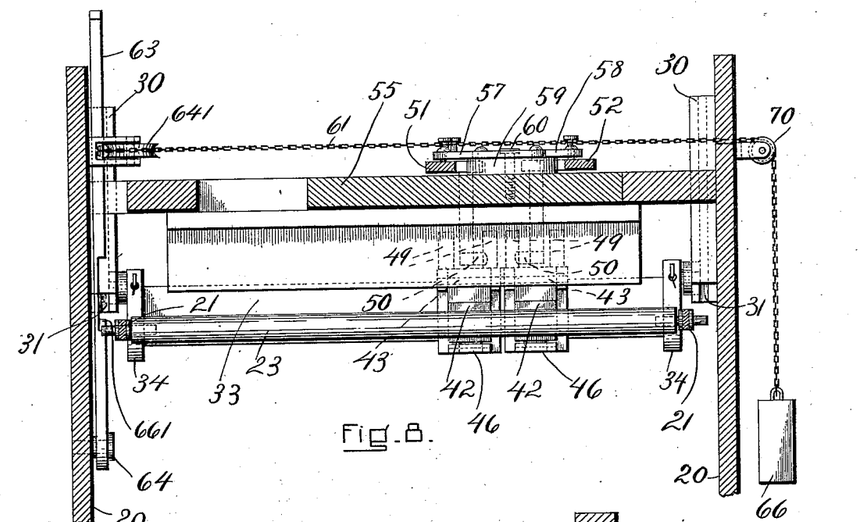
Fig. 8 represents a section on the line 8 8 of Fig. 2.
Figure 9:
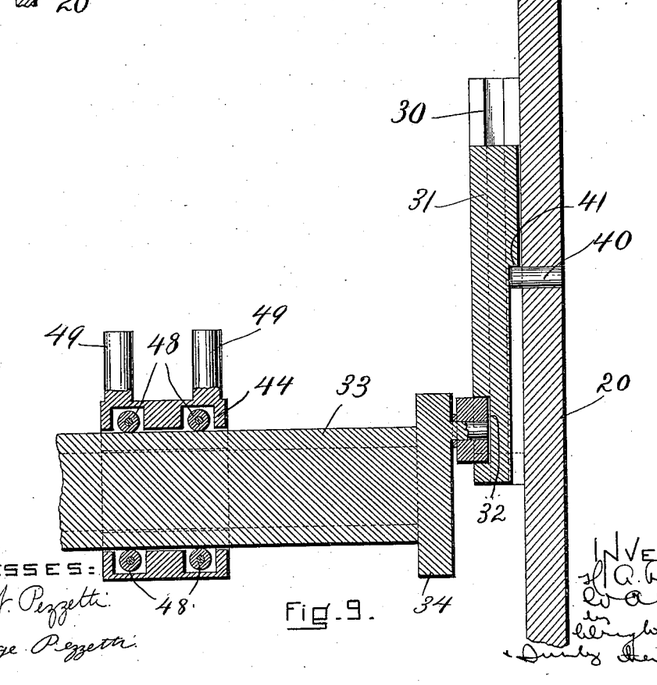
Fig. 9 represents an enlarged section through the guide which supports the members.

Referring now more particularly to Figs. 1 and 6, it will be observed that on each of the side standards 20 of the frame there are two tongued guides 30 30, in which are placed slides 31, having grooves to receive the tongues. These slides are movable in a direction perpendicular to the plane of travel of the tables or supports. Each of the slides is formed with a groove or way 32, extending longitudinally of and parallel to the direction of travel of the supports. These slides are outside of the tables, as shown in Fig. 6. Extending between the slides is a "cross-bar" or "guide," as we term it, which is indicated at 33. This cross-bar is provided at each end with a shoe 34, having rollers 35, lying in the ways or grooves 32. The lower portion of each shoe is curved, as at 36, so that it may rest upon the ends of the tables, as will be subsequently described. The guide or cross-bar is normally held at the left end of the ways 32, as shown in Fig. 2, by weights 37, which are connected by chains or flexible connections 38 therewith, said flexible connections passing over idlers 39, as clearly shown in Figs. 2, 8, and 9. To limit the downward movement of the slides, so as to position the guide 33, the side frames are provided with pins 40 to engage shoulders 41 on the slides, as indicated in Fig. 9. Normally the guide 33 and the slides drop by gravity to the position shown in Fig. 2, so as to bring the working members on the guide in position to operate upon the work. These working members are mounted to slide upon the said guide in a direction transverse to the path of movement of the carriers. Said working members consist in the present instance of two slicker-blades 42, which are pivoted at 43 to carriers 44. Springs 45 bear against the members, whereby their pressure against the work is yielding, stops 46 being employed to limit the movement of said members. Each of the carriers 44 may be provided with tongues 47, extending into longitudinal grooves in the guide 33, or else said carriers may be constructed as shown in Fig. 9, in which each one is provided with rolls 48, bearing against the guide to reduce friction. The working members 42 are provided with curved operative edges 49, as shown in Figs. 2 and 4, so that they are able to treat all of that portion of the skin which lies around the end of the table or support.

Figure 7:
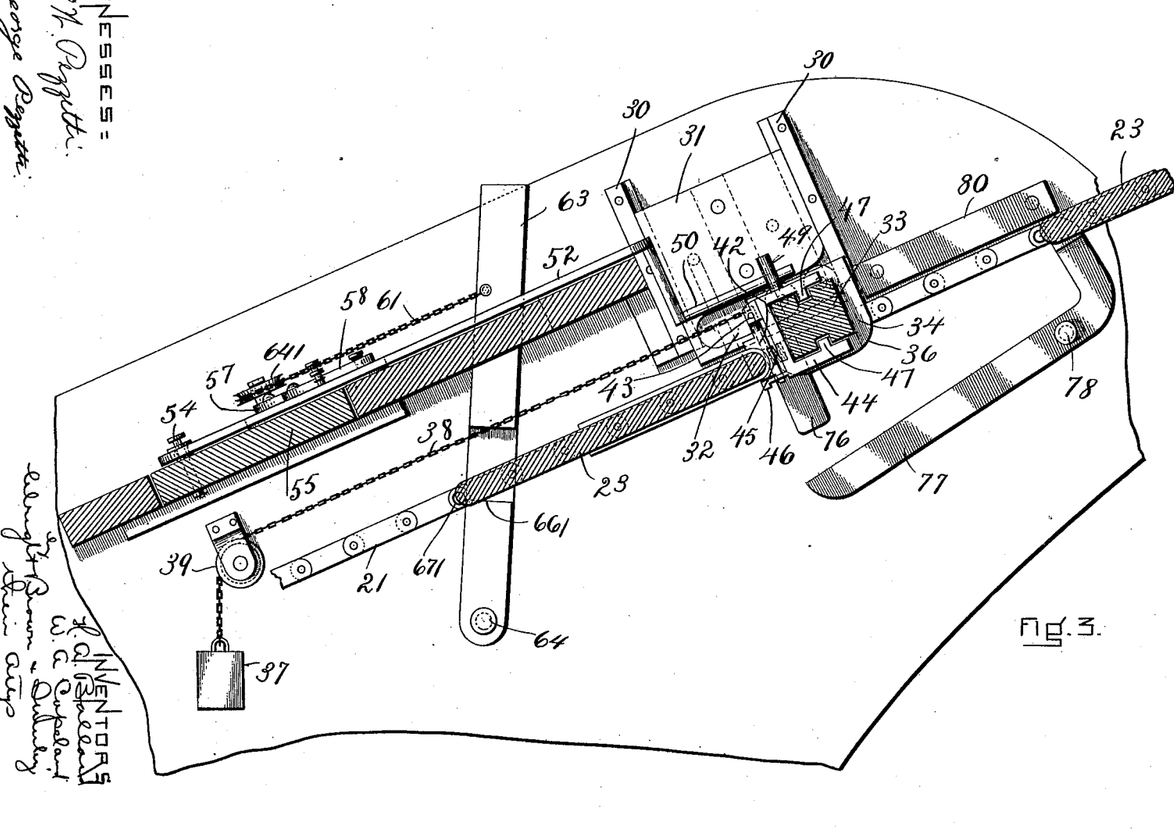
Fig. 7 is a similar view illustrating the position of the members after they have completed their lateral movements.

In operation the working members 42 lie side by side in the path of the end of the table 43, as shown in Fig. 2, and as the table moves along it carries the said members with it, the latter, however, being separated rapidly, so as to wipe the skin from its middle toward its edges, this lateral movement of the members being effected by means which we shall describe. As soon as said members have reached their outermost positions the slides 32 are raised to disconnect the working members from the skin, and they are held elevated until the table has passed from beneath them, when they are permitted to drop by gravity to operative position. The working members thus have a movement transverse of the direction of the path of movement of the tables 23 and at the same time are carried along with the tables, the effect of which is to impart to said members a movement in a direction oblique to the path of movement of said tables. To effect the lateral or transverse movement of said working members 42, the carriers 44 are both provided with upright pins or projections 49. (See Fig. 6.) Between the pins extend the ends 50 50 of two levers 51 52, which are respectively fulcrumed at 53 54 on a carriage 55, which is mounted to slide laterally in a plate 56, extending from one of the side standards to the other. These two levers are connected by links 57 58 with the opposite ends of a centrally-fulcrumed lever 59, whose pivot or fulcrum 60 is secured to the carriage 55. The lever 51 is connected by a chain or flexible connection 61 with a lever 63, fulcrumed at 64 to the side standards, as shown in Figs. 2 and 3. Said chain or flexible connection passes around an idler 641, as shown in Fig. 6. The lever 63 is formed with a shoulder 661, adapted to be engaged by a projection 671 on one of the sprocket-chains 21, so that said lever 63 is moved from the position shown in Fig. 2 to the position shown in Fig. 3. This movement of the lever causes it to draw upon the chain 61, with the result that the carriage 55, which, as shown in Fig. 6, is to one side of the median longitudinal line, (through the machine,) is moved to the middle of the machine, and the levers 51 52 are separated, as clearly shown in Fig. 7. Consequently the ends 50 of the levers are caused to move the working members transversely, so as to wipe, rub, or put out that portion of the skin which lies upon the end of the support or table. For the purpose of returning the carriage 55 and the levers 51 52 to original position two weights 66 67 are employed, they being connected by chains or flexible connections 68 69 with the levers 52 51, respectively, as shown in Fig. 6, said chains passing over idlers 70 71 on the outer side of the machine. When the working members reach the outermost positions, as previously explained, they are raised to disconnect them from the work, and to this end it will be observed in Figs. 6 and 7 that each of the tables 23 is provided in its front edge with a notch 72 72 to permit the member to be raised as soon as they register therewith.

In order to raise the working members, the slides 32 are provided with downwardly-extending projections 76, (see Figs. 1 and 2,) which are adapted to be engaged by angle-levers 77, fulcrumed at 78 on both the side standards of the machine. One end of each of these levers lies under the projection 76, while the other end extends into the path of the projection 67 on the sprocket-chain. These projections are so located as to engage the levers 77 and operate them at the proper time to raise the slides 32 from the position shown in Fig. 3 to the position shown in Fig. 4, and the guides are held in that position until the projections 67 pass beyond the ends of the lever 77, when the slides drop until the curved portions 36 of the shoes 34 rest upon the outer ends of the table or until said table has passed from under, after which the slides drop into operative position, as shown in Fig. 2. It is evident that to permit this rising and falling of the guide 33, the slides 32, and the working member without affecting the relationship of said working members with the levers 51 52 the latter must be constructed to move up and down with the said members, and consequently it will be observed from Fig. 2 that the apertures in the ends of the levers through which the fulcrums 53 pass are somewhat enlarged. The connections between the links 58 and the lever 59 are likewise loose for the same purpose. It will be observed that the same projections 671 operate the lever 63 and the lever 77, they being properly spaced for this purpose; but it is quite evident that different projections on the chain may be employed to accomplish the different functions performed by the said projections.

It will be seen in Fig. 2 that immediately above the lever 77 are placed guides 80, which prevent the sprocket-chain from rising when the projections 67 engage said levers, for otherwise the chains might rise when they engage the levers and slide off without effecting the movement of the levers.

After the wiping members have acted upon a skin, having been moved to the sides of the machine and elevated, they are returned to original position by the two weights 66 67 and the chains 68 69, hereinbefore referred to, the weights being allowed to act as soon as the lever 63 is released from the projection 671 on the sprocket-chain 21.

It is thought that a detailed description of the machine, in view of the description which has been previously given, is unnecessary, it sufficing to state that as each table emerges from between the main working members that portion of the skin which lies upon the end of the table is engaged with and wiped by the members 42 with a lateral wiping movement—that is, with a movement longitudinally of the end of the table.

While it is not strictly essential that this lateral wiping movement shall be supplemented by a lateral movement of both working members over the middle line of the table, yet that is highly desirable, and for that reason both working members are given a lateral motion in the same direction by means of the slide 55 and its actuating means, as above described.

We do not herein claim to be the first to provide means for wiping that portion of the skin which lies upon the end of the support, as it forms the subject-matter of the application of Chain and Copeland, Serial No. 75,556, filed September 16, 1901.

What we do claim is—

1. A machine of the character described comprising a work-support having approximately flat faces and an end whereby a skin or hide may be folded over said end to lie against said faces, one or more operating members movable longitudinally of the said end, for treating that portion of the hide or skin which lies upon the said end; and provisions whereby said members are operated.

2. A machine of the character described comprising a work-support having approximately flat faces and an end, whereby a hide or skin may be folded over the said end to lie against said faces, an operating member movable longitudinally of the said end to treat that portion of the skin or hide which lies thereon, and means for automatically actuating said member.

3. A machine of the character described comprising a work-support having approximately flat faces and an end, whereby a hide or skin may be folded over the said end to lie against said faces, means for moving said support in a plane parallel with its faces, and means movable longitudinally of the end of said support for treating that portion of the skin or hide which lies upon the end of the support.

4. A machine of the character described, comprising a series of traveling flat supports, each adapted to have a skin or hide stretched around its end, a working member movable transversely of the path of movement of the supports for wiping or treating the skin or hide on the end of each support as it is presented thereto, and means whereby said member is operated.

5. A machine of the character described comprising a series of traveling flat supports each adapted to have a skin or hide stretched around its end, working members arranged to move in opposite directions across the path of movement of said supports to treat the skin or hide on the end of each support as it is presented thereto, and means for operating said members.

6. A machine of the character referred to comprising a traveling support, a working member lying in the path of the said support, and means for moving said member longitudinally of the end of said support to treat the skin thereon.

7. A machine of the character referred to comprising a traveling support, working members lying in the path of movement of said support and intermediate of its ends, means for moving said members in opposite directions to wipe the skin on the end of the support, and means whereby said members are moved with the support during their movement in opposite directions.

8. A machine of the character referred to, comprising a support adapted to have a skin folded about its end, a guide arranged transversely of the path of travel of the support, one or more members movably mounted on said guide to treat that portion of the skin or hide which lies on the end of the support, and means for moving said member or members.

9. A machine of the character referred to comprising a support adapted to have a skin folded about its end, a guide, oppositely-acting members mounted on said support and movable longitudinally of the end of said support to treat that portion of the skin which lies upon the end of the support, and provisions whereby said members are moved as described.

10. A machine of the character referred to comprising a traveling support adapted to have a hide or skin folded around its end, a working member movable longitudinally of the end of said support for engaging and treating the skin on the end of the support, provisions for moving said member, and means for disengaging said member from said support when it has treated the skin.

11. A machine of the character referred to comprising a traveling support adapted to have a skin or hide folded around its end, a carrier movable in the direction of movement of the support and also movable longitudinally of the end thereof, a working member on said carrier, provisions whereby said member is actuated, and means for moving said carrier out of the path of movement of said support.

12. A machine of the character referred to comprising a traveling support adapted to have a skin or hide folded around its end, two working members to operate on that part of the skin folded around the end of the support, and means to first move these working members together longitudinally of the end of the support, and next move them in opposite directions one toward one side, the other toward the other side of the support.

In testimony whereof we have affixed our signatures in presence of two witnesses.

HARRIE A. BALLARD.
WILLIAM A. COPELAND.

Witnesses:
MARCUS B. MAY,
C. C. STECHER.